(12) United States Patent
Fresca

(10) Patent No.: US 11,870,284 B2
(45) Date of Patent: Jan. 9, 2024

(54) CHARGING DEVICE FOR AN ELECTRICAL CHARGING PROCESS OF A MOBILE DEVICE IN A VEHICLE

(71) Applicant: Dr. Ing. h.c. F. Porsche Aktiengesellschaft, Stuttgart (DE)

(72) Inventor: Domenica Fresca, Gerlingen (DE)

(73) Assignee: Dr. Ing h. c. F. Porsche AG, Stuttgart (DE)

( * ) Notice: Subject to any disclaimer, the term of this patent is extended or adjusted under 35 U.S.C. 154(b) by 133 days.

(21) Appl. No.: 16/837,004

(22) Filed: Apr. 1, 2020

(65) Prior Publication Data
US 2020/0328609 A1    Oct. 15, 2020

(30) Foreign Application Priority Data
Apr. 10, 2019   (DE) .................. 10 2019 109 400.3

(51) Int. Cl.
*H02J 7/00*   (2006.01)
*H02J 50/10*  (2016.01)
*B60R 11/02*  (2006.01)
B60R 11/00    (2006.01)

(52) U.S. Cl.
CPC ...... *H02J 7/00309* (2020.01); *B60R 11/0241* (2013.01); *H02J 50/10* (2016.02); *B60R 2011/0075* (2013.01)

(58) Field of Classification Search
CPC ...... H02J 7/00309; H02J 50/10; H02J 7/0042; B60R 11/0241; B60R 2011/0075; B60R 11/02

USPC .......................................................... 320/108
See application file for complete search history.

(56) References Cited

U.S. PATENT DOCUMENTS

| | | | | |
|---|---|---|---|---|
| 5,559,673 | A * | 9/1996 | Gagnon | G06F 1/20 165/122 |
| 9,167,732 | B2 * | 10/2015 | Iwanaga | H02J 50/10 |
| 2007/0236880 | A1 * | 10/2007 | Noisternig | G11B 33/10 |
| 2018/0224909 | A1 * | 8/2018 | Koo | H02J 50/10 |
| 2018/0317348 | A1 * | 11/2018 | Taga | H05K 7/20 |

FOREIGN PATENT DOCUMENTS

| KR | 101879656 B1 * | 7/2018 | ........ H01F 27/025 |
|---|---|---|---|
| WO | WO-2015077239 A1 * | 5/2015 | .............. B60N 2/02 |

* cited by examiner

*Primary Examiner* — Edward Tso
*Assistant Examiner* — Ahmed H Omar
(74) *Attorney, Agent, or Firm* — Gerald E. Hespos; Michael J. Porco

(57) ABSTRACT

A charging device (10) for an electrical charging process of a mobile device (200) in a vehicle, having a charging face (20) for placing a mobile device (200) on in a contact-forming fashion, and electrical charging means (30) for electrically charging a mobile device (200) which is placed on the charging face (20), further having an encapsulating housing (40) which at least partially surrounds the charging face (20). The encapsulating housing (40) has at least one inlet section (42) with at least one inlet opening (44) for letting in passenger compartment air (IL) from the passenger compartment of the vehicle as cooling air (KL) for cooling the mobile device (200) and/or the charging face (20), and at least one outlet section (46) with at least one outlet opening (48) for letting out the cooling air (KL) into the passenger compartment of the vehicle.

9 Claims, 3 Drawing Sheets

CHARGING DEVICE FOR AN ELECTRICAL CHARGING PROCESS OF A MOBILE DEVICE IN A VEHICLE

CROSS REFERENCE TO RELATED APPLICATION

This application claims priority under 35 USC 119 to German Patent Appl. No. 10 2019 109 400.3 filed on Apr. 10, 2019, the entire disclosure of which is incorporated herein by reference.

BACKGROUND

Field of the Invention

The invention relates to a charging device for an electrical charging process of a mobile device in a vehicle and to a central console for a passenger compartment in a vehicle having at least one such charging device.

Related Art

Charging devices are arranged in vehicles to charge mobile devices. Such charging devices are frequently embodied as contact panels or charging panels on which the respective mobile device can be placed and charged in a contact-forming fashion. This no longer requires a cable to be plugged into the mobile device but instead a charging process can be generated in the mobile device by means of cableless charging processes and induction. Known solutions have such charging faces integrated into the center console or in the region of the center console. If the mobile device is placed on this charging face, the charging process can start and proceed automatically while the cell phone is stored there.

A disadvantage of the known devices is that the charging face and the mobile device heat up during a charging process. Temperatures of up to 50° C. can be reached on the charging face and also in the mobile device during a relatively long charging process. The temperature is difficult to influence in the interior of the center console, and this leads to a situation in which both the charging face and the mobile device exceed a temperature threshold that limits the charging. Mobile devices therefore usually are equipped with a temperature threshold of 35° C. to 45° C. so that the charging performance is reduced starting from the time when such a charging threshold is reached. With known solutions, this leads to a situation in which when a mobile device is placed on a charging face in the vehicle the charging process is carried out only up to the time when this threshold temperature is reached. Complete charging of the mobile device therefore is not available, since the charging process is aborted before complete charging and after the time when the threshold temperature is reached. Therefore, the charging performance is reduced.

An object of the invention is to overcome the disadvantages described above. In particular an object of the invention is to ensure a cost-effective and simple charging performance for the charging device that is as constant and complete as possible.

Advantages, features and details of the invention can be found in the claims, the description and the drawings. Features and details that are described in relation to the charging device also apply to the center console, and vice versa, so that reference is and can always be made reciprocally in respect to individual aspects of the invention.

SUMMARY

A charging device according to the invention performs an electrical charging process of a mobile device in a vehicle. For this purpose, the charging device has a charging face on which the mobile device can be placed in a contact-forming fashion. Furthermore, the charging device is equipped with electrical charging means for electrically charging a mobile device that has been placed on the charging face. Furthermore, the charging device has an encapsulating housing that at least partially surrounds the charging face. The encapsulating housing is equipped with at least one inlet section with at least one inlet opening for letting in passenger compartment air from the passenger compartment of the vehicle as cooling air for cooling the mobile device and/or the charging face. Furthermore, the encapsulating housing has at least one outlet section with at least one outlet opening for letting out the cooling air into the passenger compartment of the vehicle.

The charging device may be based on known solutions of making available a charging face that can be used for cableless charging by placing the mobile device thereon. This charging face has corresponding electrical charging means. In the simplest case, this charging means may be configured with a cable that supplies the charging face with current. The charging face induction means can be provided as electrical charging means to generate induced charging or induced charging in the mobile device. In this context, in the first step it is irrelevant whether the charging face and the electrical charging means are integrated permanently into the encapsulating housing or have been inserted subsequently. Therefore, subsequent installation of such a charging face with such an electrical charging means into an encapsulating housing can also lead to a charging device according to the invention.

An encapsulating housing according to the invention also may be configured as storage space for the charging face and/or for the mobile device. The encapsulating housing can be a center console or part of such a center console. Such a center console can be enclosed, at least partially, and can have corresponding cover devices. The mobile device can be inserted in and/or positioned on the charging face of the charging device so that electrical charging can be carried out in a cableless fashion. During such a charging process, the charging face and the mobile device heat up in the described manner. However, the invention provides cooling that may be carried out in a passive manner. More particularly, the encapsulating housing may have an inlet section with at least one inlet opening. The at least one inlet opening can be configured, for example, in a slit shape, circular shape or with other desired geometry. Depending on the actual geometry and the corresponding cooling demand, it is also possible to provide two or more inlet openings in the inlet section. It is also conceivable to provide two or more inlet sections, each with one, two or more inlet openings.

In some embodiments, passenger compartment air from the vehicle passenger compartment may penetrate the interior of the encapsulating housing through the inlet opening of the inlet section. Passenger compartment air can therefore be used as cooling air for cooling the mobile device. An air-conditioned atmosphere normally is present in the passenger compartment of the vehicle and often is preset with a defined temperature. Usually, the passenger compartment temperatures within a vehicle are in a range between approximately 18° C. and 24° C. independently of the external temperature. The range between 20° C. and 22° C. usually is found to be comfortable by vehicle occupants. When there are cold external temperatures it may be the case that the passenger compartment temperature is somewhat colder, but heating usually is carried out. In the critical warm situations, for example if the external temperature around the vehicle exceeds 25° C. or even 30° C. or more, an air-conditioning system will usually cool the passenger compartment of the vehicle and in turn ensure that there is a constant, or essentially constant, internal temperature in the region of approximately 20° C.

On the basis of this correlation between the external temperature around the vehicle and the temperature within the passenger compartment of the vehicle it can be determined that, irrespective of the actual operating situation and temperature situation, the passenger compartment temperature around the car is suitable as cooling air, since it usually lies in a range around 20° C., which is below the 35° C. to 45° C. temperature threshold for the deactivation of the charging process in the mobile device.

The invention may use passenger compartment air, that typically is in the range of around 20° C., through the inlet opening for cooling the mobile device or the charging face. The encapsulating housing may have an outlet section with at least one outlet opening to avoid a situation in which the cooling air backs up within the encapsulating housing. This configuration is particularly useful for embodiments of the encapsulating housing that have a cover. It is therefore possible to discharge or conduct the cooling air out of the encapsulating housing after it has at least become partially loaded with heat from the mobile device or the charging face. This permits convection that feeds in cool passenger compartment air as cooling air and discharges the heated cooling air out of the encapsulating housing again after heat has been transferred to the cooling air.

The invention performs a cooling function for the mobile device and the charging face in a passive manner and by convection of cooling air through the encapsulating housing. Thus, temperatures during the charging process can be controlled significantly better and to be kept below the temperature threshold, which would otherwise bring about a reduction in the charging performance or even an entire switching off of the charging process. Therefore, with a charging device according to the invention, the charging performance can be boosted in a cost-effective and simple manner so that complete charging of the mobile device can also be ensured.

The encapsulating housing may have a cover so that the charging device is enclosed or essentially enclosed. This embodiment is made possible by the one or more inlet sections and the one or more outlet sections. An encapsulated housing in the prior art is likely bring about a situation in which the temperature threshold is exceeded due to an accumulation of heat in the enclosed interior of the prior art encapsulating housing, thereby causing the charging performance to be reduced to a minimum or even switched off completely. However, the invention provides convection of cooling air through the interior of the encapsulating housing when the cover device is closed, so that the temperature is prevented from reaching the temperature threshold, or there is at least a delay before reaching the threshold. A charging device according to the invention even can be within an enclosed center console while achieving an increased charging performance and/or complete charging of the mobile device.

The at least one inlet opening and the at least one outlet opening may be at different heights of the encapsulating housing. In particular, the at least one outlet opening may be above the at least one inlet opening to achieve a corresponding chimney effect. The arrangement at different heights of the encapsulating housing permits a flow through the encapsulating housing from bottom to top or from top to bottom. The volume that flows through is increased in this way so that an increased volume of the exchange of air and therefore of the cooling effect can be influenced. Thus, it is possible to utilize free convection. The inlet openings and the outlet openings also may be on different sides of the encapsulating housing to increase the volume of cooling air that flows through.

A charging device according to the invention may have at least one inlet opening arranged underneath the charging face. Such an arrangement promotes the chimney effect as explained above. This arrangement also promotes a flow from below onto the charging face and therefore also onto the mobile device. More particularly, this arrangement enables a flow around the charging face and around the mobile device from bottom to top. The rising heat draws in the passenger compartment air so that heated air rises on the mobile device and therefore generates a suction effect. This design produces the described chimney effect and in particular to free convection.

The charging device according to the invention may have at least one outlet opening above the charging face. This embodiment may be combined with one or both of the embodiments of the two preceding paragraphs. In particular, the rising heat from the mobile device can escape upward through the outlet openings that are arranged above the charging face. This promotes the described suction effect for the inlet opening. If the inlet opening is located underneath the charging face and the outlet opening above the charging face, this effect is boosted even further and is optimized.

The charging device also may comprise a ventilation device for generating forced convection for the cooling air between the at least one inlet opening and the at least one outlet opening. Thus, a forced convection may be made available either in an assisting manner or as the entire means of execution. The forced convection causes the cooling air within the encapsulating housing to eddy and promotes the convection or makes it available. The ventilation device achieves efficient cooling even when there are small differences in heat so that the advantages of the invention can be achieved independently of the actual surrounding situations. In this context, the electrical connection of the electrical charging means can be used to utilize the ventilation device.

The passage cross section of the at least one inlet opening may correspond to or essentially correspond to the passage cross section of the at least one outlet opening. In particular, the number of inlet openings may be equal to the number of outlet openings, and the corresponding total cross-sectional area of all the inlet openings may be equal to the total cross-sectional area of all of the outlet openings. This avoids an accumulation of heat since the air that has entered can also exit from the interior of the encapsulating housing with the same volume flow with the same quantity per unit of time. In some embodiments, the passage cross sections of the outlet opening may be somewhat larger than the passage cross sections of the inlet opening to ensure that an accumulation of heat is carried away with high probability.

The charging device may comprise a directing device in the encapsulating housing for directing the cooling air onto the charging face. This can be a passive guiding device or an active directing device. In the simplest case, the directing device may be a flow section that deflects the orientation or direction of flow of the inflowing passage compartment air as cooling air and directs the air in the direction of the charging face or of the mobile device. Such a baffle plate or flow plate can be formed, for example, as part of the inlet opening. In addition to influencing and orienting the direction of flow it is possible in this way to set other flow parameters, such as the turbulence of the flow. The intentional generation of eddies in the free convection causes the cooling air to impact at defined locations of the mobile device or of the charging face and makes available a defined dwell time to pick up heat from there and carry it away as efficiently as possible.

The charging face may have at least one cooling section for making contact with cooling air to transfer heat to the cooling air. Such a cooling section can have, for example, an enlarged surface. Therefore, the cooling section can make available cooling fins to improve the transfer of heat. Such fins or cooling sections may be next to the charging face or in the edge region of the charging face next to the mobile device. Cooling sections also can be formed on the rear side or underside of the charging face.

A center console for a passenger compartment of a vehicle may have at least one charging device according to the invention. A center console according to the invention therefore provides the same advantages as have been explained in detail with respect to a charging device of the invention.

Further advantages, features and details of the invention can be found in the following description in which exemplary embodiments of the invention are described individually with respect to the drawings. In this context, the features mentioned in the claims and in the description can be essential to the invention either individually per se or in any desired combination.

DETAILED DESCRIPTION

Figure 1:
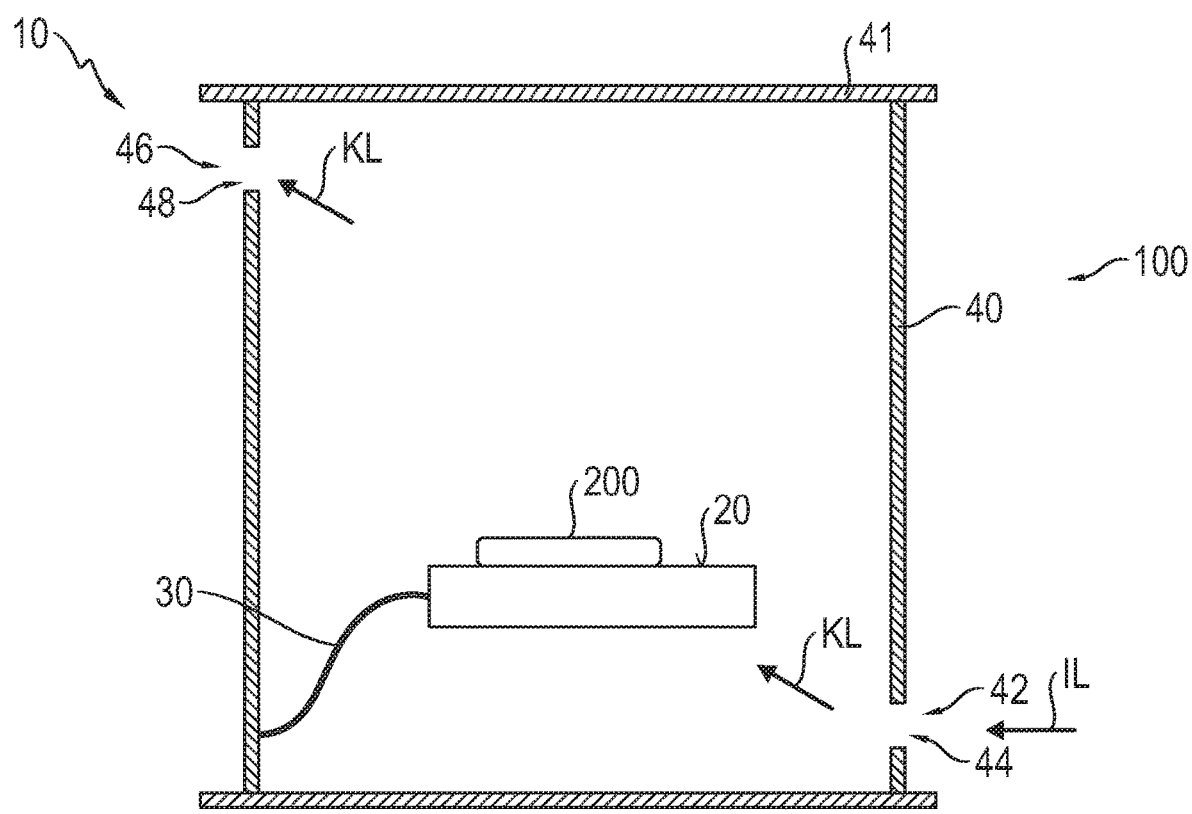
FIG. 1 shows a first embodiment of a charging device of the invention.

FIG. 1 is a schematic cross section of the simplest configuration of a charging device 10 according to the invention. An encapsulating housing 40 is provided in this embodiment as part of a center console 100. A mobile device 200 can be placed on a charging face 20 that is arranged within the encapsulating housing 40 and in the interior of this center console 100. The device may be a cell phone. Electrical charging means 30 are provided to permit a cableless electrical charging of the mobile device 200. The electrical charging means 30 is an inductive electrical charging means underneath the charging face 20. The mobile device 200 is placed on the charging face 20, as illustrated in FIG. 1.

FIG. 1 also shows that the encapsulating housing 40 is enclosed by a housing cover 41. The cover 41 makes it possible to prevent the housing 40 from being looked into and ensures additional protection for the mobile device 200. However, in a normal case this would bring about an accumulation of heat in the interior of the encapsulating housing 40, since the mobile device 20 and the charging face 20 output heat during the charging process. To prevent this accumulation of heat, the encapsulating housing 40 has an inlet section 42 and an outlet section 46.

It is possible for passenger compartment air IL to penetrate the interior of the encapsulating housing 40 via an inlet opening 44 of the inlet section 42. The passenger compartment air usually has air-conditioned temperatures in the region around 20° C. It is therefore suitable for there to be a flow, as cooling air KL, around the charging face 20 and the mobile device 200. The cooling air KL flows around these two components and takes up heat and is heated in this way. The heated cooling air KL rises as a result of the heating and will exit again into the passenger compartment of the vehicle top left through the outlet opening 48 of the outlet section 46.

As is apparent from FIG. 1, the simplest solution can be formed by means of free convection. The outlet section 46 is arranged top left, and therefore rising heated cooling air KL will exit at the outlet section 46. To avoid an underpressure in the interior of the encapsulating housing 40, the suction effect that is formed there will suck in passenger compartment air IL as cooling air KL from the bottom right through the inlet opening 44.

Figure 2:
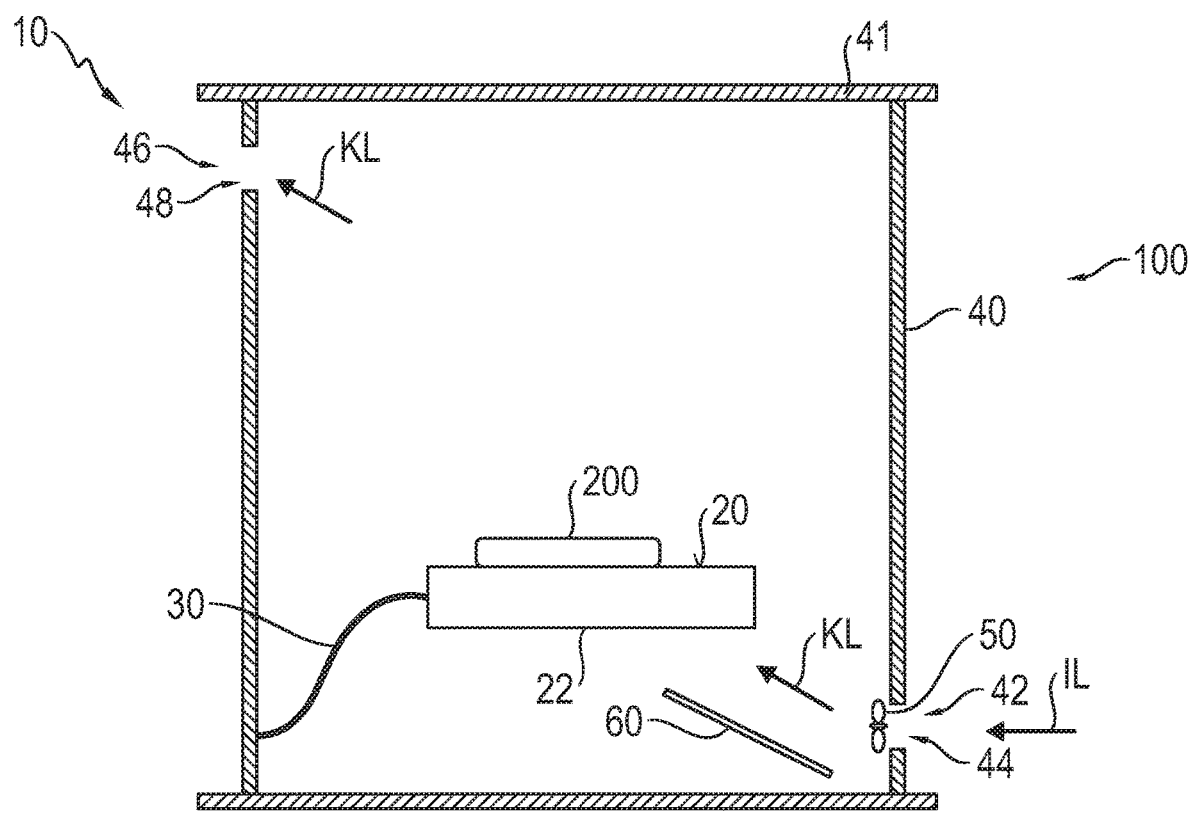
FIG. 2 shows a further embodiment of a charging device according to the invention.

FIG. 2 shows a development with essentially two additional components. First, there is a ventilation device 50 that can promote, or even completely generate, the free convection described in the paragraphs above. In this embodiment, the ventilation device 50 is in the region of the inlet opening 44, but the ventilation device 50 can be arranged at any desired point within the encapsulating housing 40 and also at the outlet opening 48. To ensure a defined direction of flow of the cooling air KL, a directing device 60 is provided to direct the cooling air KL onto the underside of the charging face 20 and there onto a cooling face embodied as a cooling section 22. The cooling section 22 makes available an enlarged surface to provide improved outward conduction.

Figure 3:
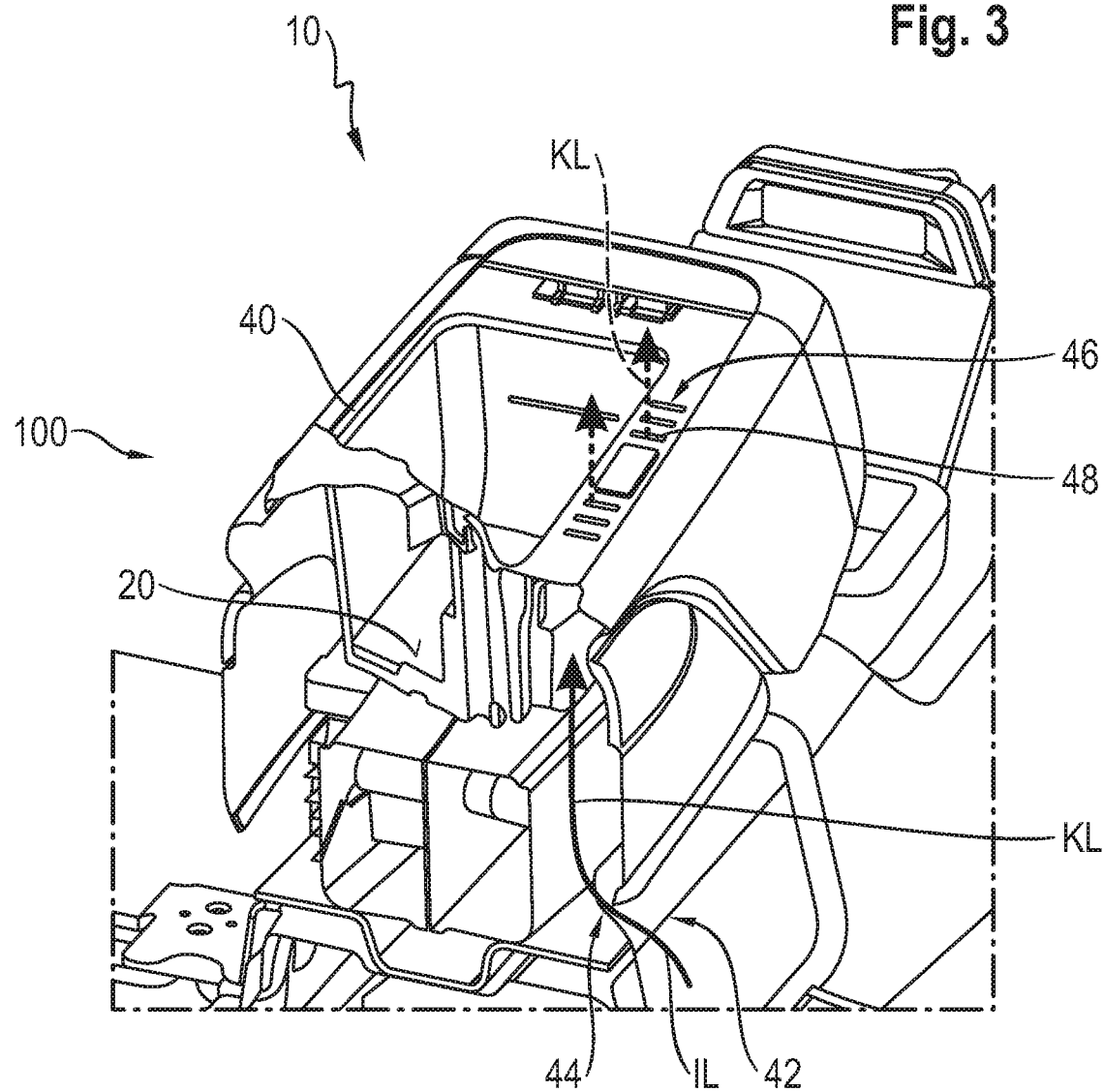
FIG. 3 shows a further embodiment of a charging device according to the invention.

FIG. 3 shows a configuration of a charging device 10 in the region of a center console 100. Passenger compartment air IL is brought into the encapsulating housing 40 through an inlet opening 44 of an inlet section 42 in the same way. The cooling air KL is guided over the charging face 20. Thus, heat can be taken up from the charging face 20 or from a mobile device 200 that is arranged there, and can subsequently flow out again as heated cooling air KL through the outlet opening 48 of the outlet section 46.

The above explanation of the embodiments describes the invention exclusively within the scope of examples. Of course, individual features of the embodiments can, where technically appropriate, be freely combined with one another without departing from the scope of the present invention.

What is claimed is:

1. A passively cooled charging apparatus for electrically charging a mobile device in a vehicle, comprising:
    an encapsulating housing having an interior defined by at least a first walls with at least one inlet opening that is open to a passenger compartment of the vehicle, and a second wall with at least one outlet opening that is open to the passenger compartment of the vehicle;
    a charging device disposed in the interior of the encapsulating housing between the first and second walls, the charging device having an upwardly facing charging face facing toward the outlet opening and configured for placing the mobile device on the charging face in a contact-forming fashion, the charging device further having a cooling face facing oppositely from the charging face and toward the inlet opening; and an electrical charging means for electrically charging the mobile device that is placed on the charging face, wherein the at least one inlet opening is at a first vertical position in the encapsulating housing, the at least one outlet opening is at a second vertical position spaced above the first vertical position, and the charging device is at a third vertical position higher than the first vertical position and lower than the second vertical positions with the cooling face facing toward the at least one inlet opening and with the interior of the housing being configured so that cooling air flows from the at least one inlet opening to the at least one outlet opening without a downward flow component so that air in the interior of the encapsulating housing that is heated by the electrical charging means flows up by a chimney effect and exits the encapsulating housing upwardly via the outlet opening and is replaced by a cooling air flow that enters the interior of the encapsulating housing from the passenger compartment via the at least one inlet opening and flows up adjacent the charging device to replace the air heated by the electrical charging means that has exited the encapsulating housing via the at least one outlet opening, impinges directly upon both the cooling face and the charging face to cool the charging device by free convection.

2. The charging apparatus of claim 1, further comprising top wall that includes a housing cover that closes or essentially closes the interior of the encapsulating housing.

3. The charging apparatus of claim 1, wherein the passage cross section of the at least one inlet opening essentially corresponds to the passage cross section of the at least one outlet opening.

4. The charging apparatus of claim 1, further comprising a directing device arranged in the encapsulating housing and configured for directing the cooling air onto the charging face.

5. A center console for a passenger compartment in a vehicle, the center console having the charging apparatus of claim 1.

6. The charging apparatus of claim 1, wherein the encapsulating housing is configured to accommodate a flow of the cooling air around the charging device from bottom to top.

7. The charging apparatus of claim 1, further comprising a mobile device removably positioned on the charging face of the charging device, the charging device being disposed and configured relative to the encapsulating housing so that the cooling air flow impinges directly on the cooling face of the charging device, the charging face of the charging device and the mobile device on the charging face of the charging device so that the cooling air flow cools both the charging device and the mobile device.

8. The charging apparatus of claim 2, wherein the at least one outlet opening is formed in the top wall.

9. The charging apparatus of claim 8, wherein the at least one outlet opening is formed in a portion of the top wall spaced from the housing cover so that the air in the interior of the encapsulating housing that is heated by the electrical charging means flows up by the chimney effect and exits the encapsulating housing upwardly via the outlet opening even when the housing cover is closed.

* * * * *